United States Patent
Kain et al.

(10) Patent No.: US 7,021,710 B2
(45) Date of Patent: Apr. 4, 2006

(54) JUVENILE VEHICLE SEAT WITH MOVABLE HEADREST

(75) Inventors: James Kain, Troy, OH (US); Eugene Balensiefer, Seymour, IN (US); William Horton, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/797,280

(22) Filed: Mar. 10, 2004

(65) Prior Publication Data
US 2005/0212342 A1    Sep. 29, 2005

(51) Int. Cl.
*B60N 2/28* (2006.01)
(52) U.S. Cl. .............................. 297/256.11; 297/256.16; 297/250.1; 297/254; 297/440.15
(58) Field of Classification Search ........... 297/256.11, 297/256.1, 250.1, 61, 396, 410, 251, 256.16, 297/254, 255, 353, 440.16, 440.15
See application file for complete search history.

(56) References Cited

U.S. PATENT DOCUMENTS

| | | |
|---|---|---|
| 3,265,437 A | 8/1966 | Mincieli |
| 3,910,634 A | 10/1975 | Morris |
| 4,040,664 A | 8/1977 | Tanaka et al. |
| 4,047,755 A | 9/1977 | McDonald et al. |
| 4,342,483 A | 8/1982 | Takada |
| 4,376,551 A | 3/1983 | Cone |
| 4,545,617 A | 10/1985 | Drexler et al. |
| 4,632,456 A | 12/1986 | Kassai |
| 4,709,960 A | 12/1987 | Launes |
| 4,790,601 A | 12/1988 | Burleigh et al. |
| 4,854,639 A | 8/1989 | Burleigh et al. |
| 4,858,997 A | 8/1989 | Shubin |
| 4,915,446 A | 4/1990 | Darling et al. |
| 5,082,325 A | 1/1992 | Sedlack |
| 5,106,158 A | 4/1992 | Dukatz et al. |
| 5,181,761 A | 1/1993 | Meeker |
| 5,335,964 A | 8/1994 | Sedlack et al. |
| 5,344,213 A | 9/1994 | Koyanagi |
| 5,468,046 A | 11/1995 | Weber et al. |
| 5,527,094 A | 6/1996 | Hiramatsu et al. |
| 5,580,126 A | 12/1996 | Sedlack |

(Continued)

FOREIGN PATENT DOCUMENTS

DE    3536206 A1    4/1987

(Continued)

OTHER PUBLICATIONS

Graco® Website, 2 pages, dated Jun. 9, 2004, entitled TurboBooster® 8674PRN, www.gracobaby.com.

(Continued)

*Primary Examiner*—Peter M. Cuomo
*Assistant Examiner*—Stephen D'Adamo
(74) *Attorney, Agent, or Firm*—Barnes & Thornburg LLP

(57) ABSTRACT

A juvenile seat includes a base and a lower back section coupled to the base. The base includes a bottom seat portion and the lower back section is positioned to lie at an angle relative to the bottom seat portion. The lower back section includes a planar front surface. A headrest of the juvenile seat is coupled to the lower back section for up and down movement relative to the base and the lower back section. The headrest includes a planar front surface and is positioned forward the planar front surface of the lower back section. The headrest and lower back section cooperate to provide a back rest surface for the juvenile seated therein.

56 Claims, 9 Drawing Sheets

U.S. PATENT DOCUMENTS

| | | | |
|---|---|---|---|
| 5,775,772 A | 7/1998 | Lefranc | |
| 5,845,968 A * | 12/1998 | Lovie | 297/256.1 |
| D413,026 S | 8/1999 | Reithmeier | |
| 6,019,426 A * | 2/2000 | Nakagawa | 297/256.11 |
| 6,030,047 A | 2/2000 | Kain | |
| 6,045,184 A * | 4/2000 | Nakagawa | 297/250.1 |
| 6,135,553 A | 10/2000 | Lovie et al. | |
| 6,139,100 A | 10/2000 | Baskin-Lockman et al. | |
| 6,155,638 A | 12/2000 | Bapst | |
| 6,189,970 B1 | 2/2001 | Rosko | |
| 6,273,509 B1 | 8/2001 | Reithmeier et al. | |
| 6,378,950 B1 | 4/2002 | Takamizu et al. | |
| D461,320 S | 8/2002 | Sher | |
| 6,428,099 B1 | 8/2002 | Kain | |
| 6,464,294 B1 * | 10/2002 | Kain | 297/250.1 |
| 6,481,794 B1 | 11/2002 | Kassai et al. | |
| 6,485,101 B1 | 11/2002 | Kassai et al. | |
| 6,491,348 B1 | 12/2002 | Kain | |
| 6,547,333 B1 | 4/2003 | Parenteau et al. | |
| 6,550,856 B1 * | 4/2003 | Ganser et al. | 297/61 |
| 6,623,074 B1 | 9/2003 | Asbach et al. | |
| 6,659,564 B1 | 12/2003 | Kassai et al. | |
| 6,682,143 B1 * | 1/2004 | Amirault et al. | 297/250.1 |
| 6,705,675 B1 * | 3/2004 | Eastman et al. | 297/250.1 |
| 6,811,216 B1 * | 11/2004 | Sedlack | 297/250.1 |
| 6,908,151 B1 * | 6/2005 | Meeker et al. | 297/250.1 |
| 2001/0011838 A1 | 8/2001 | Kassai et al. | |
| 2002/0036418 A1 * | 3/2002 | Kain | 297/250.1 |
| 2002/0145318 A1 | 10/2002 | Asbach et al. | |
| 2002/0195867 A1 | 12/2002 | Barger et al. | |
| 2004/0124677 A1 * | 7/2004 | Meeker et al. | 297/255 |
| 2004/0124678 A1 | 7/2004 | Williams et al. | |

FOREIGN PATENT DOCUMENTS

| | | |
|---|---|---|
| EP | 576847 A2 | 1/1994 |
| EP | 1 084 900 A2 | 3/2003 |
| GB | 2 282 32 1 | 4/1995 |
| JP | 05254366 A * | 10/1993 |

OTHER PUBLICATIONS

Britex USA Website, 1 page, dated Jun. 9, 2004, entitled Starriser Comfy, www.britaxusa.com.

Britex USA Website, 2 pages, dated Jun. 9, 2004, entitled Bodyguard booster with Side Impact Protection, www.britaxusa.com.

Britex USA Website, 1 page, dated Jun. 9, 2004, entitled Roadster, www.britaxusa.com.

* cited by examiner

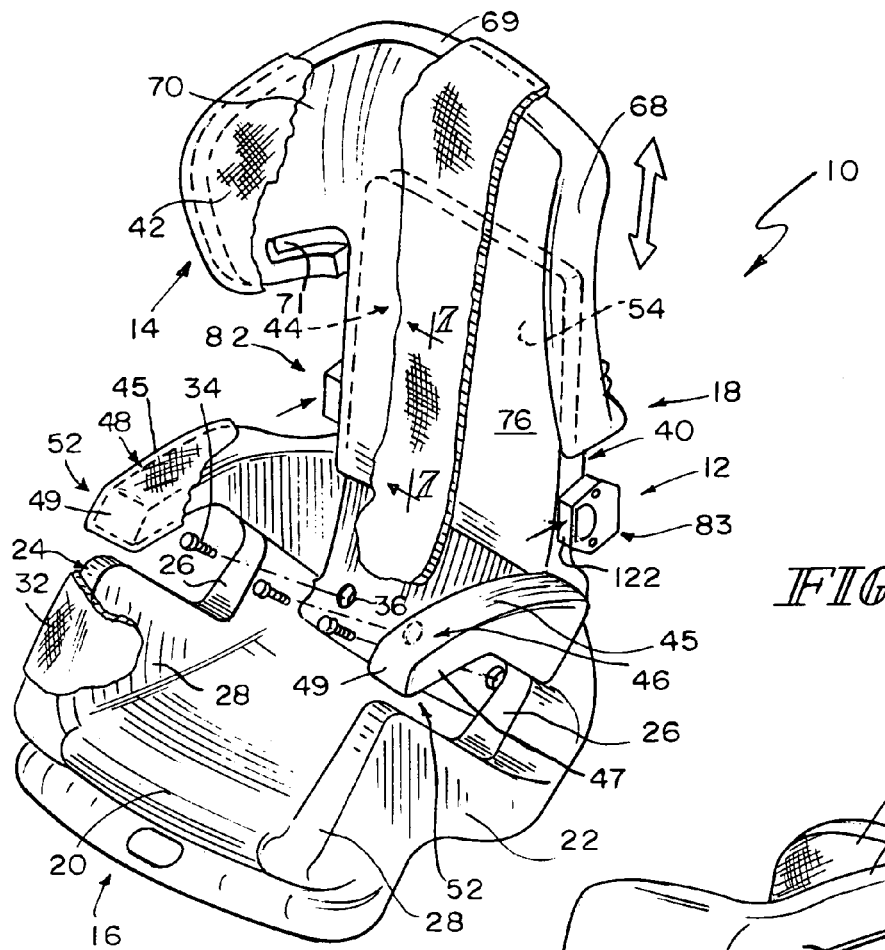
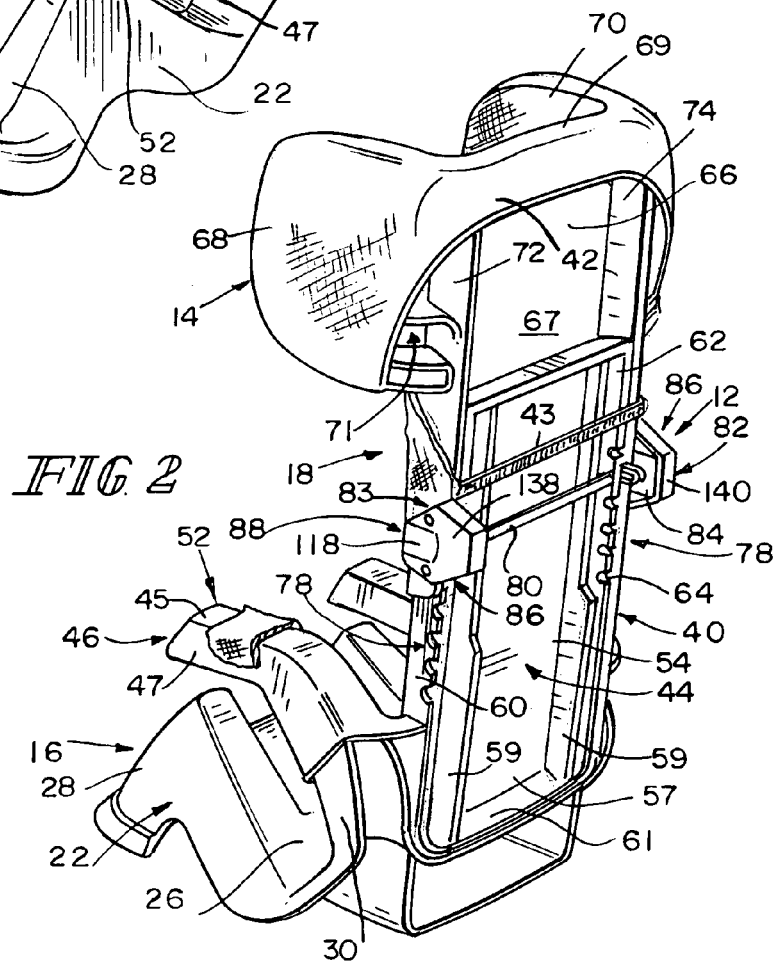

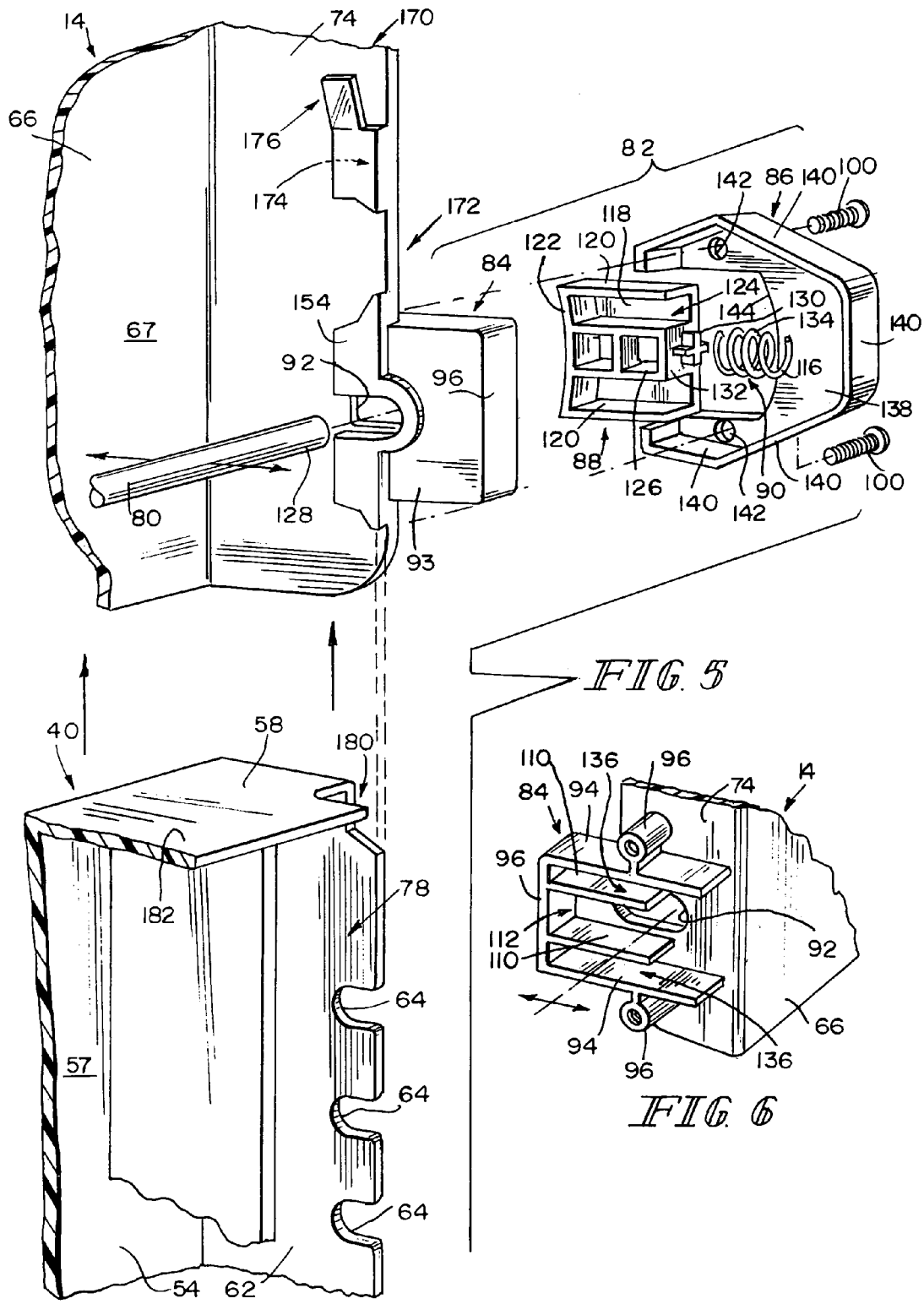

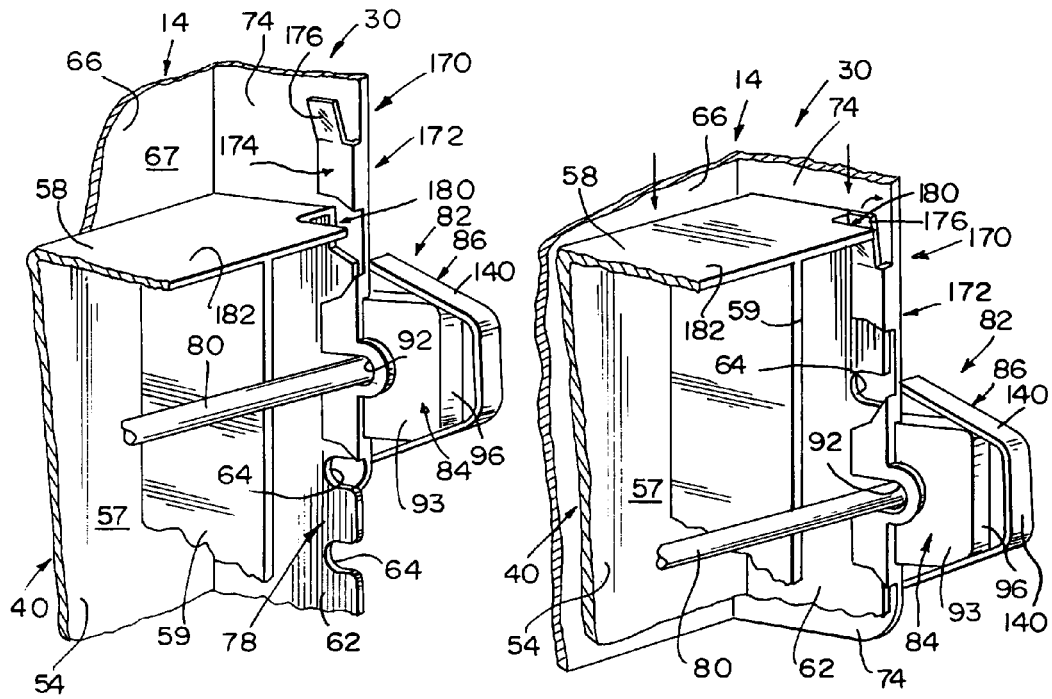
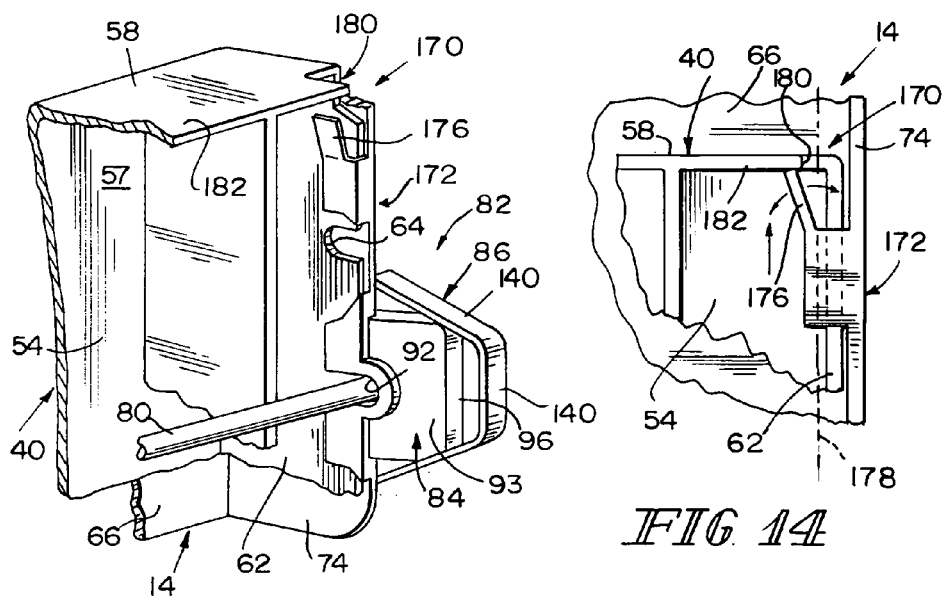

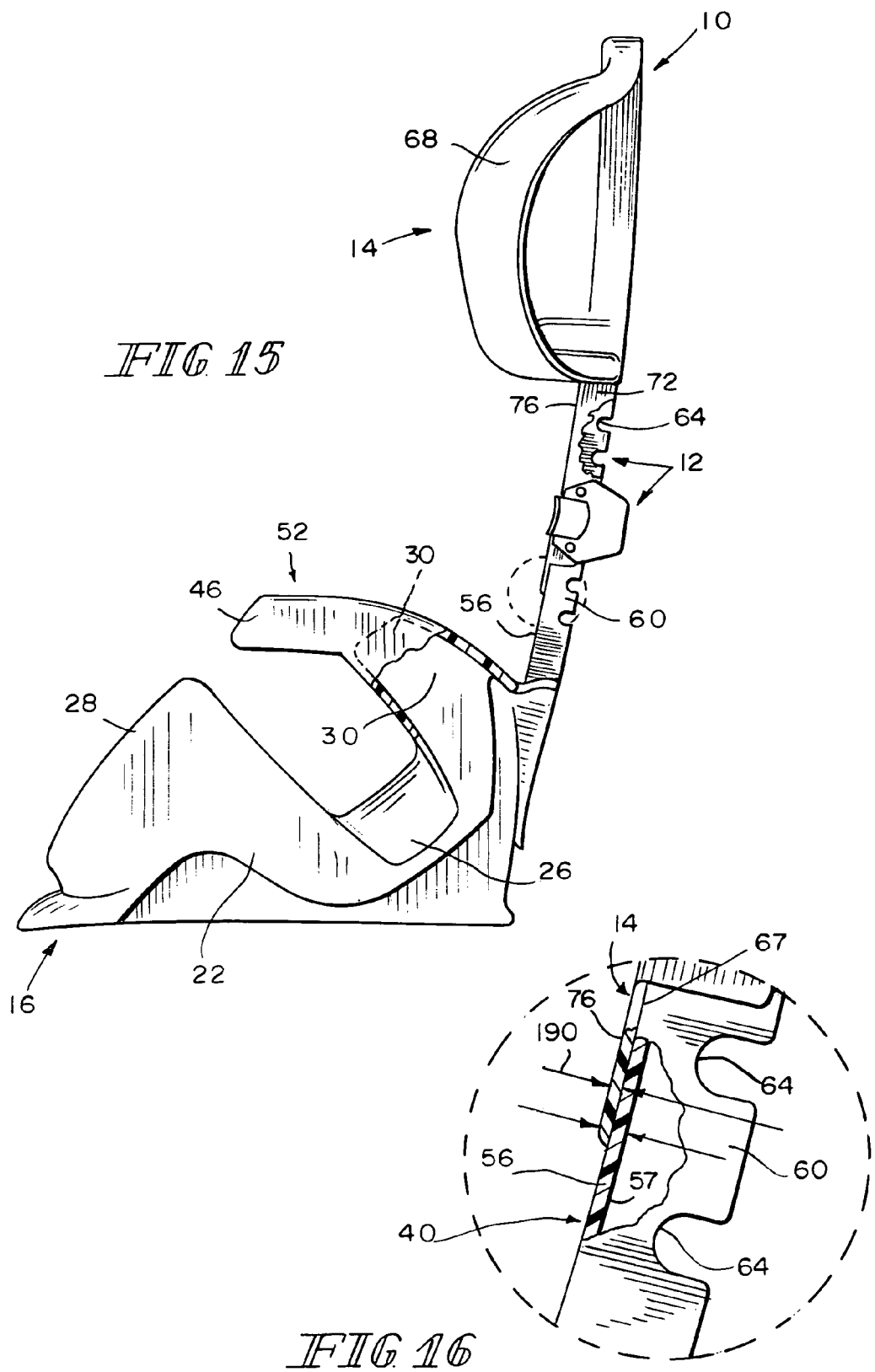

JUVENILE VEHICLE SEAT WITH MOVABLE HEADREST

BACKGROUND

The present disclosure relates to a juvenile seat for use in a vehicle, and in particular to a juvenile vehicle seat having a movable headrest and an apparatus for raising and lowering the headrest. More particularly, the present disclosure relates to a multi-piece backrest in a juvenile vehicle seat.

Many juvenile seats are formed to include a headrest which adjusts upwardly and downwardly relative to a bottom seat portion of the juvenile seat. Such a juvenile seat can be adapted by a user to seat children of different sizes.

SUMMARY

According to the present disclosure, a juvenile seat includes a base and a lower back section coupled to the base and positioned to lie at an angle relative to a bottom seat portion of the base. A headrest of the juvenile seat is coupled to the lower back section for up and down movement relative to the base and the lower back section to accommodate small-and large-sized children therein. The headrest includes a planar front surface positioned forward of a planar front surface of the lower back section. An offset distance between the planar front surface of the lower back section and the planar front surface of the headrest is less than approximately 0.375 inch (9.53 mm) in order to provide a smooth and continuous back rest surface for the juvenile seated therein. Specifically, the offset distance of the illustrative juvenile seat is 0.120 inch (3.05 mm).

The headrest further includes a planar rear surface engaged with the planar front surface of the lower back section. An alignment means of the headrest is provided for aligning the lower back section with the headrest to produce the small offset distance and allow movement of the headrest relative to the lower back section. The alignment means includes a flange coupled to each of a first and second side wall of the headrest. Each flange cooperates with the respective first and second side wall to define a slot formed to receive a respective first and second side rail of the lower back section therein. The first and second side walls of the headrest, therefore, are slidably engaged with the respective first and second side rails of the lower back section.

The juvenile seat further includes an "anti-backout" mechanism to prevent a user from unintentionally raising the headrest so high above the base and relative to the lower back section so as to remove the headrest from the lower back section. The anti-backout mechanism, therefore, limits the height of the headrest above the bottom seat portion of the base and prevents the user from removing the headrest from engagement with the lower back section. The anti-backout mechanism includes a stopper coupled one of the side walls of the headrest to engage top wall of the lower back section when the headrest has been raised a maximum height above the bottom seat portion. Illustratively, the stopper is a tab positioned at an angle relative to a vertical axis along the headrest side wall.

The juvenile seat of the present disclosure further includes an "armrest-nesting" feature wherein a pair of armrest shells of the lower back section cooperate with a pair of armrest supports of the base to form armrests of the juvenile seat. Illustratively, each armrest shell includes a top wall, an end wall, and a pair of side walls which cooperate with each other to define a cavity formed to receive a respective armrest support of the base therein. The armrest supports each form a rear portion of one of the first and second side walls of the base. Apertures of the lower back section positioned between the armrest shells of the lower back section are aligned with apertures of the base positioned between the armrest mounts of the base when the armrest mounts are received within the respective armrest shells. A fastener is received within the apertures of the base and lower back section to coupled the lower back section to the base.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a front perspective view of a juvenile booster seat of the present disclosure showing a base of the booster seat and a seat back of the booster seat coupled to the base and showing a headrest located in a lowered position relative to the base and arranged to move up and down relative to the base to adjust the height of the headrest above a bottom seat portion of the base;

FIG. 2 is a rear perspective view of the booster seat showing the headrest located in a raised position relative to the base and showing a height-adjustment mechanism coupled to a rear portion of the seat back for moving the headrest up and down relative to the base;

FIG. 5 is a rear perspective, exploded view of a portion of the headrest height-adjustment mechanism showing one of two actuators of the height-adjustment mechanism, the actuator including a mount rigidly coupled to the headrest of the seat back, an outer cover adapted to be coupled to the mount, a push-button, and a spring positioned substantially between the mount and the outer cover, and also showing a first end of a height-adjustment bar to be received within the actuator;

FIG. 6 is a perspective view of the mount shown in FIG. 5 (from another point of view) showing a slot for receiving a portion of the height-adjustment bar therethrough;

FIGS. 11–14 are rear perspective views of a portion of the booster sheet showing an "anti-backout" feature of the booster seat to prevent a user from unintentionally removing the headrest from the lower back section of the seat back when raising the headrest above the base;

FIG. 11 is a rear perspective view of a portion of the booster seat showing the headrest being installed and lowered upon the lower back section of the seat back, and further showing an anti-backout tab of the headrest;

FIG. 12 is a rear perspective view similar to FIG. 11 showing the anti-backout tab of the headrest sliding past a cut-out of the lower back section as the headrest is being installed, or lowered, onto the lower back section;

FIG. 13 is a rear perspective view similar to FIGS. 11 and 12 showing the headrest installed onto the lower back section;

FIG. 14 is a rear view of the anti-backout feature of the booster seat showing the anti-backout tab engaged with an upper lip portion of the lower back section of the seat back to prevent the user from further moving the headrest in an upward direction relative to the lower back section.

FIG. 15 is a side elevation view of the juvenile booster seat showing the headrest in a partly raised position relative to the lower back section;

FIG. 16 is an enlarged view of the circled section shown in FIG. 15 showing a small offset distance between mating portions of the headrest and lower back section and showing mounting of one of the armrest shells on the seat back on an armrest support on the base;

DETAILED DESCRIPTION

Figure 3:
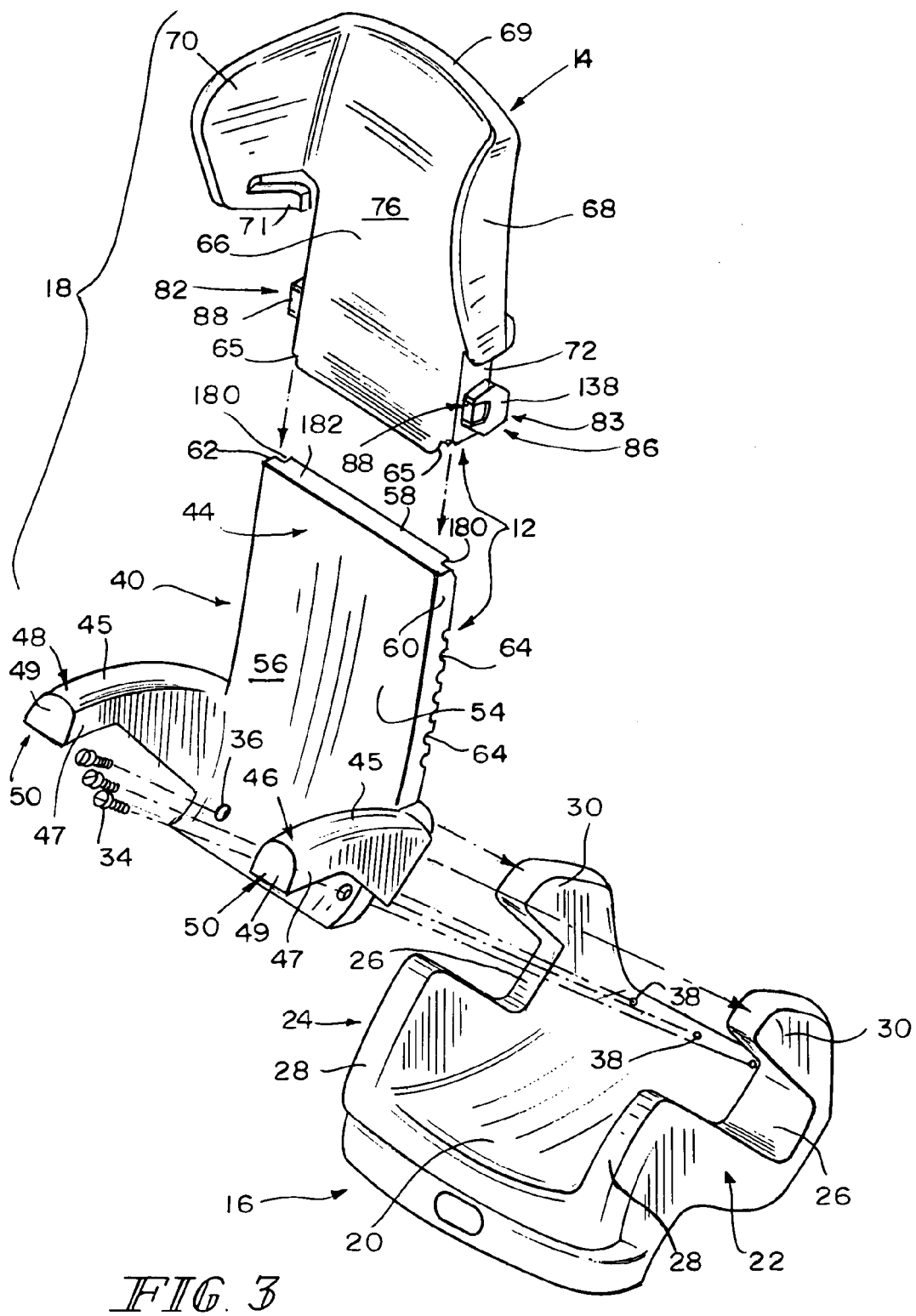
FIG. 3 is a front, exploded, perspective view of the booster seat of FIGS. 1 and 2 showing the base, the seat back, and the headrest, the seat back including a lower back section having vertically spaced-apart slots formed therein to engage a portion of the height-adjustment mechanism to establish the height of the headrest relative to the base and lower back section.

A juvenile booster seat 10 is provided for supporting juveniles therein. Booster seat 10 may be coupled to a seat (not shown) within a vehicle (not shown), for example, to secure the juvenile within the vehicle. Although reference is made to a booster seat 10, it is within the scope of this disclosure to include juvenile vehicle seats or other such seats for supporting and securing juveniles within a vehicle. Booster seat 10 includes a base 16 and a seat back 18 coupled to base 16. Seat back 18 provides the backrest surface for the juvenile seated therein and includes a lower back section 40 and an upper, movable section or headrest 14 coupled to lower back section 40 for up and down movement relative to lower back section 40 to adjust an overall height of seat back 18 above base 16. As shown in FIGS. 15 and 16 and discussed in greater detail below, a small offset distance 190 is provided between mating portions of the headrest 14 and lower back section 40. This small offset distance 190 provides a smooth and continuous backrest surface for the juvenile seated therein.

Booster seat 10 further includes an "anti-backout" feature or mechanism 170, best shown in FIGS. 5, and 11–14. The anti-backout mechanism 170 prevents a user from unintentionally raising the headrest 14 so high above base 16 and relative to lower back section 40 so as to remove the headrest 14 from the lower back section 40. In other words, the anti-backout mechanism 170 prevents the user from removing headrest 14 from engagement with lower back section 40.

Booster seat 10 further includes an "armrest-nesting" feature wherein a pair of armrest shells 46, 48 of lower back section 40 cooperate with armrest supports 30 of base 16 to form armrests 52 of booster seat 10, as shown in FIGS. 1, 2, and 16, provided for a juvenile to rest his or her arms thereon. Illustratively, the armrest supports 30 nest within a cavity 50 of each respective armrest shell 46, 48 to form armrests 52.

Looking now to FIG. 1, booster seat 10 includes base 16 and seat back 18 coupled to base 16. Seat back 18 provides the backrest surface for the juvenile seated therein and includes headrest 14 and lower back section 40 discussed above. Base 16 includes a bottom seat portion 20 adapted to support a juvenile's bottom and upper legs thereon, and a pair of side walls 22, 24 coupled to the bottom seat portion 20. First and second side walls 22, 24 are provided for preventing lateral movement of the juvenile seated in seat 10 and are located on opposite sides of bottom seat portion 20.

A notch 26 is formed in each side wall 22, 24 for receiving portion of a seat belt (not shown) of the vehicle (not shown) therethrough to position a portion of the seat belt over a juvenile's lap, for example, when the juvenile is seated on bottom seat portion 20. Notches 26 act to define a front portion 28 of each side wall 22, 24 and a rear portion or armrest support 30 of each side wall 22, 24. As is discussed above and in greater detail below, the armrest support 30 of each side wall acts as a lower back mounting section of the base 16 and is received within respective cavities 50 of the seat back 18. A cushion or booster seat cover 32 is provided for covering the base 16.

Seat back 18 of booster seat 10 is coupled to base 16 and positioned to lie at an angle to bottom seat portion 20 to extend upward from base 16 generally perpendicularly to bottom seat portion 20. Seat back 18 is coupled to base 16 by screws 34 received through corresponding apertures 36 located at a bottom portion of seat back 18 and into corresponding apertures 38 of base 16. As mentioned above, seat back 18 includes lower, stationary back section 40 and upper, movable section or headrest 14 coupled to lower back section 40 for up and down movement relative to lower back section 40 to adjust an overall height of seat back 18 above bottom seat portion 20.

Headrest 14 is positioned forward the planar front surface 56 of lower back section 40. Further, a planar rear surface 67 of headrest 14 is engaged with a portion of the planar front surface 56 of lower back section 40. As is discussed in greater detail below, a height-adjustment mechanism or height-adjusting means 12 of booster seat 10 is provided for adjusting the height of a headrest 14 of the seat 10 up and down relative to base 16 and lower back section 40 of the seat 10 in order to accommodate small-and large-sized children therein.

Looking now to FIGS. 15 and 16, a small offset distance 190 is provided between mating or adjacent portions of headrest 14 and lower back section 40. This small offset distance 190 provides a smooth and continuous back rest surface for the juvenile seated therein. Illustratively, offset distance 190 is measured between a planar front surface 56 of lower back section 40 and a planar front surface 76 of headrest 14. Further illustratively, offset distance 190 is approximately 0.120 inch (3.05 mm). Lateral offset distance 190 meets the FSMV213 requirements for the year 2004 which require the offset distance for the back surface of all juvenile vehicle seats to be less than 3/8 (0.375) inch (9.53 mm).

Figure 4:
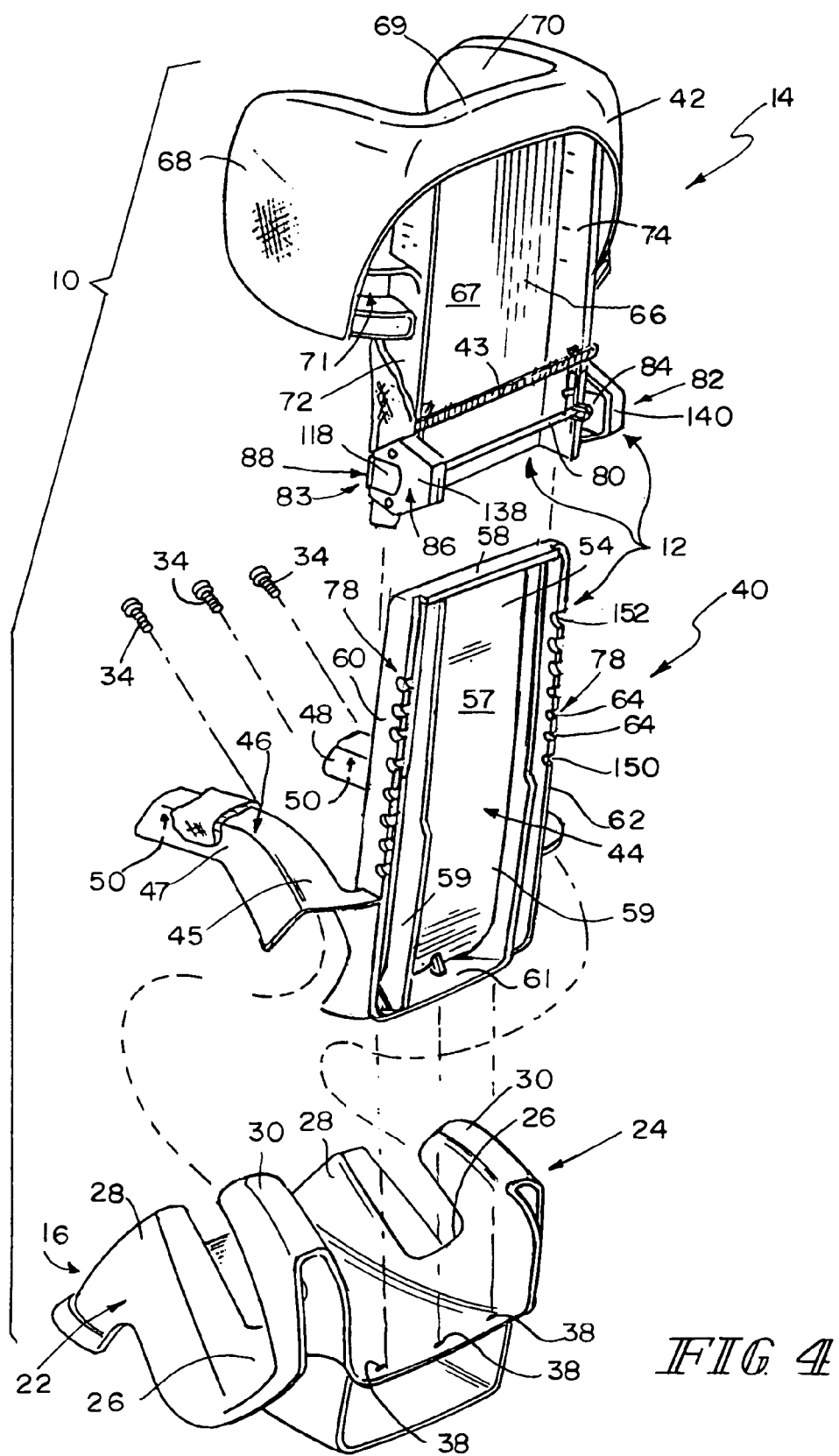
FIG. 4 is a rear perspective, exploded view of the booster seat of FIGS. 1 and 2 showing the height-adjustment mechanism coupled to the headrest and showing how armrest shells coupled to the lower back are configured to mount on armrest supports provided on the base.

A vertical, planar body 44 of lower back section 40 includes a front or planar wall 54 having a substantially flat front surface 56 for a juvenile to rest his or her back against. Body 44 further includes a substantially flat rear surface 57, as shown in FIG. 4. A top wall 58 of body 44 is coupled to planar wall 54 as well as opposite side walls or side rails 60, 62 which are each coupled to planar wall 54 and top wall 58. As shown in FIGS. 3 and 4, side rails 60, 62 are further positioned to lie in spaced-apart relation to each other. Side rails 60, 62 and top wall 58 cooperate to define an outer rim of body 44 coupled to planar wall 54 and are positioned to extend in a rearward direction away from front surface 56 of planar wall 54. Support ribs 59 of lower back section 40 are coupled to and extend between top wall 58 and a bottom wall 61 of lower back section 40.

Looking now to FIGS. 3 and 4, headrest 14 of seat back 18 includes a back plate 66 and first and second wing member 68, 70 coupled to opposite edges of back plate 66 and positioned to lie in spaced-apart relation to one another. Each wing member 68, 70 is oriented to lie at an angle relative to back plate 66, as shown in FIGS. 1–4, for example. Each wing member 68, 70 further includes a slot 71 formed to receive a shoulder strap portion (not shown) of a seat belt system (not shown) of the vehicle (not shown). Illustratively, back plate 66 includes spaced-apart notches 65 formed therein and best shown in FIGS. 3. Notches 65 are formed in opposite lower corner areas of back plate 66.

The up and down movement of headrest 14 relative to lower back section 40 functions to raise and lower headrest 14 above bottom seat portion 20 to adapt booster seat 10 to accommodate small-and large-sized juveniles. Headrest 14 moves up and down relative to base 16 and lower back section 40 to assure proper fit for a juvenile seated in booster seat 10. A caregiver can raise and lower headrest 14 to change the height of headrest 14 by operating height-adjustment mechanism 12. A portion of height-adjustment mechanism 12 is coupled to headrest 14 and is described below in more detail. As shown in FIG. 4, a cover 42 is coupled to headrest 14 and maintained thereon by an elastic strap 43 extending across a back portion of headrest 14.

Lower back section 40 nests within headrest 14 such that headrest 14 mates with and slidingly engages lower back section 40 to provide the small offset distance 190 discussed above and shown in FIGS. 15 and 16. Side walls 72, 74 of headrest 14, rear planar surface 67 of headrest 14, and a top wall 69 of headrest 14 cooperate to define a lower back receiving area 81 or cavity formed to receive a portion of planar body 44 and side rails 60, 62 of lower back section 40 therein. Thus, lower back section receiving area 81 receives an upper mating portion of lower back section 40 therein such that side rails 60, 62 of lower back section are positioned between and lie adjacent to respective side walls 72, 74 of headrest 14.

A portion of planar front surface 56 of lower back section 40 engages a portion of rear planar surface 67 of headrest 14. Further, top wall 98 and an upper portion of side rails 60, 62, and an upper portion of planar wall 54 of body 44 are received within the area 81 of the headrest 14 defined by top wall 69, side walls 72, 74, and rear planar surface 67. This nesting of the lower back section 40 within area 81 the headrest 14 provides for small offset distance 190 discussed above and shown in FIGS. 15 and 16.

Booster seat 10 includes, therefore, means for aligning and mating headrest 14 with lower back section 40 to produce small offset 190 and allow movement of headrest 14 relative to lower back section 40. This aligning and mating means includes the structure of headrest 14 provided to create lower back section receiving area 81 for receiving lower back section 40 therein. Further, side walls 72, 74 of headrest 14 and side rails 60, 62 allow portions of height-adjustment mechanism 12 to be mounted thereon to provide for a side actuated height-adjustment mechanism, as is discussed in more detail below. This structure of headrest 14 and lower back section 40 provide for the sliding engagement between headrest 14 and lower back section 40 to yield the small offset distance 190.

As mentioned above, booster seat 10 further includes an "anti-backout" feature or mechanism 170, best shown in FIGS. 5, and 11–14. The anti-backout mechanism 170 prevents a user from unintentionally raising the headrest 14 so high above bottom seat portion 20 so as to remove the headrest 14 from the lower back section 40. In other words, the anti-backout mechanism 170 prevents the user from removing the headrest 14 from the lower back section 40. The illustrative booster seat 10 includes two anti-backout mechanisms 170. A portion of each anti-backout mechanism 170 is coupled to headrest 14 and positioned to lie above a portion of height-adjustment mechanism 12. Illustratively a portion of each anti-backout mechanism 170 is positioned to lie above anchor mounts 84 of height-adjustment mechanism 12 which are discussed in greater detail below. The features of only one anti-backout mechanism 170 are described herein. The other anti-backout mechanism 170 includes the same features and components, thus like reference numerals have been used.

As shown in FIG. 5, the anti-backout mechanism 170 includes a flange 172 coupled to side wall 74 of headrest 14. The flange (not shown) of the other anti-backout mechanism 170 is coupled to side wall 72 of headrest 14. Flange 172 is formed to define a channel 174 for receiving a portion of lower back section 40 therein. Specifically, channel 174 of flange 172 receives a portion of side rail 62 therein, as shown best in FIGS. 12 and 13. Illustrative flange 172 wraps around side rail 62 to align lower back section 40 with headrest 14 such that lower back section 40 nests within lower back receiving area 81 defined by the back plate 66 and side walls 72, 74 of headrest 14. As headrest 14 moves up and down relative to lower back section 40 flanges 172 help maintain alignment between headrest 14 and lower back section 40. Flange 172 of headrest 14, therefore, further provides structure of headrest 14 which, in cooperation with other structure of headrest 14 and lower back section 40 mentioned above, acts to mate and align lower back section 40 to headrest 14 to provide for the small offset distance 190.

A tab 176 of anti-backout mechanism 170 is coupled to flange 172 and extends upwardly from flange 172, as shown in FIG. 5 and FIGS. 11–14. Tab 176 is positioned to lie at an angle offset from a vertical axis 178, as shown in FIG. 14. Tab 176 acts as a stop to prevent upward movement of headrest 14 relative to lower back section 40 beyond a certain point or elevation. Each anti-backout mechanism 170 further includes a cut-out portion 180 of lower back section 40 formed where each side rail 60, 62 meets top wall 58 of lower back section 40. Cut-out portions 180 define a ledge 182 of top wall 58 therebetween, as shown in FIGS. 3, 6, and 11–13, for example.

Looking now to FIGS. 11–12, seat back 18 is assembled by sliding headrest 14 onto lower back section 40 such that lower back section 40 nests within side walls 72, 74 of headrest 14. As shown in FIGS. 11 and 12, headrest 14 is slid downwardly onto lower back section 40 such a portion of side walls 72, 74 are received within respective flanges 172 of anti-backout feature 170. Tab 176 is urged to slide through cut-out portion or corner notch 180 and may bend inwardly toward respective side walls 72, 74 as each tab 176 is urged through the notch 180. Once headrest 14 has been moved sufficiently downwardly onto lower back section 40 such that each tab 176 has slid fully past or through notch 180, each tab 176 springs back to the opened position.

In operation, anti-backout mechanism 170 operates to restrict upward movement of the headrest 14 relative to the lower back section 40 beyond a certain height in order to prevent a user from unintentionally removing headrest 14 from lower back section 40 where adjusting headrest 14 upwardly. As shown in FIG. 14, tab 176 engages a portion of ledge 182 near cut-out portion or notch 180 when headrest 14 has been moved upwardly to the maximum height above bottom seat portion 20. Tabs 176 thus act as stops or stoppers when engaging ledge 182 to prevent the user from raising headrest 14 any further.

If desired, however, a user may remove headrest 14 from lower back section 40 by pressing each tab 176 toward the respective side rails 60, 62 of the lower back section 40. By moving the tabs 176 to this vertical or closed position, the user is able to continue to slide the headrest 14 upwardly relative to lower back section 40 by sliding the closed tabs 176 through respective notches 180, as described above with respect to coupling the headrest 14 to the lower back section 40.

In addition to anti-backout mechanism 170, booster seat 10 further includes the armrest-nesting feature mentioned above. This armrest nesting feature is illustrated, for example, in FIG. 16 and includes the pair of armrest shells 46, 48 of lower back section 40 which define cavity 50 for receiving, and thus cooperating with, armrest supports 30 of base 16 to form armrests 52 of booster seat 10. Armrests 52 of booster seat 10 are shown best in FIGS. 1, 2, and 16, provided for a juvenile to rest his or her arms thereon. Illustratively, the armrest supports 30 each nest within a cavity 50 of the respective armrest shell 46, 48 to form armrests 52.

As shown in FIGS. 3 and 4, lower back section 40 of seat back 18 includes vertical, planar body 44 and the pair of armrest shells 46, 48 each coupled to body 44 at a lower end of body 44, as shown in FIG. 2, for example. Each armrest shell 46, 48 includes a top wall 45, a pair of side walls 47, and an end wall 49. Top wall 45, side walls 47 and end wall 49 cooperate to define cavity 50 formed to receive at least a portion of armrest support 30 or the lower back mounting section of each respective side wall 22, 24 of base 16 therein. As mentioned above, armrest shells 46, 48 and armrest supports 30 cooperate to form armrests 52 of booster seat 10, as shown, for example, in FIGS. 1 and 2, provided for a juvenile to rest his or her arms thereon. Each armrest support 30 of base 16 nests within a respective armrest shell 46, 48 of lower back section 40 when lower back section 40 is coupled to base 16.

As mentioned above, lower back section 40 is coupled to base 16 by fasteners 34 received through apertures 36, shown in FIG. 3, formed through a lower portion of lower back section 40 generally between armrest shells 46, 48 and apertures 38 formed in base 16 generally between armrest mounts 30. As mentioned above, lower back section 40 of seat 10 is coupled rigidly to base 16 to provide for little or no relative movement between lower back section 40 and base 16. Although base 16 and lower back section 40 of illustrative booster seat 10 are separate components, it is within the scope of this disclosure for base 16 and lower back section 40 to be formed as a single, unitary component of seat 10.

As discussed above, height-adjustment mechanism or height-adjusting means 12 of booster seat 10 is provided for adjusting the height of headrest 14 up and down relative to both base 16 and lower back section 40 in order to accommodate small and large sized children therein. As shown in FIGS. 2–4, a pair of bar receivers 78 of height-adjustment mechanism 12 are provided in each side rail 60, 62 of body 44 of lower back section 40. Each bar receiver 78 includes a plurality of bar-receiving slots or notches 64 illustratively provided along a vertical length of each respective side rail 60, 62.

As will be discussed in more detail below, each notch 64, or parallel set of notches 64, corresponds to a vertical height above bottom seat portion 20 to which headrest 14 of seat back 18 may be positioned to accommodate a particular child, for example. Notches 64 of height-adjustment mechanism 12 are provided to receive a separate portion of height-adjustment mechanism 12, specifically a height-adjustment bar 80, therein for adjusting and securing a height of headrest 14 above bottom seat portion 20 to accommodate small-and large-sized juveniles therein. Height-adjustment bar 80 is provided to engage and disengage vertical bar receivers 78 to secure headrest 14 at a desired height above bottom seat portion 20. Although in the illustrative embodiment each bar receiver 78 is a respective side rail 60 or 62 appended to the body 44 of lower back section 40, it is within the scope of this disclosure to form or position the one or more bar receivers 78 at any suitable location on the booster seat 10.

Height-adjustment mechanism 12 of booster seat 10 operates to adjust the height of the headrest 14 relative to base 16. A portion of height-adjustment mechanism 12 is coupled to headrest 14 and receivable within notches or slots 64 formed in lower back section 40 to lock headrest 14 at a desired height above bottom seat portion 20 of base 16. Height-adjustment mechanism 12 includes a height-adjustment bar 80 positioned to lie along a width of headrest 14 and lower back section 40 illustratively below cover strap 43, as shown in FIG. 2, for example. Height-adjustment mechanism 12 further includes two actuators 82, 83 coupled to height-adjustment bar 80. Illustratively, each actuator 82, 83 is coupled to an outer end of bar 80 to position each actuator 82, 83 substantially on one side of the booster seat 10 (as shown in FIG. 1, for example) for side operation of the height-adjustment mechanism 12 by a user or caregiver. The positioning of the actuators 82 on either side of seat back 18 allows a user to actuate and move the height-adjustment bar 80 of the height-adjustment mechanism 12 from both the front and back side of the seat back 18. As is discussed in greater detail below, actuators 82, 83 operate to bias height-adjustment bar 80 to a locked position received within one pair of the slots 64 of the lower back section 40.

The actuators 82, 83 are identical to each other; therefore, reference is made only to the left actuator 82 shown in FIGS.

5–10. Actuator 82 includes an anchor mount 84 coupled to the headrest 14 of seat back 18. Illustratively, the anchor mounts 84 of each actuator 82, 83 are coupled to side walls 72, 74 of headrest 14. Each side wall 72, 74 is coupled to back plate 66 and extends generally in a direction away from a front surface 76 of back plate 66.

Actuator 82 further includes an outer cover 86 coupled to the anchor mount 84 and a push-button 88 positioned between the anchor mount 84 and outer cover 86 for sliding movement relative to both the outer cover 86 and anchor mount 84. A spring 90 is mounted between the push-button 88 and anchor mount 84 normally to bias the push-button 88 toward a locked position, described in more detail below. The push-button 88 of each actuator 82 is coupled to an end of the height-adjustment bar 80 such that the height-adjustment bar 80 is urged to move with each push-button 88 between a locked position where the height-adjustment bar is engaged with the slots 64 of the lower back section 40 an unlocked position where the height-adjustment bar is disengaged from the slots 64 of the lower back section 40. Spring 90 operates as a locking means for moving the push-button 88, and thus the height-adjustment bar 80 coupled to the push-button 88 to the locked position.

As mentioned above, each anchor mount 84, as better shown in FIG. 6, is coupled to one of the side walls 72, 74 of headrest 14. Anchor mount 84 and side walls 72, 74 each include a guide slot 92 formed to receive a portion or end of the height-adjustment bar 80 therethrough. Slot 92 is substantially oval or elliptically shaped to permit sliding back and forth movement of the height-adjustment bar 80 therein. Anchor mount 84 further includes an outer wall 93, opposite outer side walls 94 spaced-apart from each other, and an outer end wall 96 coupled to both side walls 94 and outer wall 93. A screw mount 96 is coupled to each of the outer side walls 94 and is provided to receive a screw 100 (shown in FIG. 5) therethrough to couple outer cover 86 to anchor mount 84.

Figure 9:
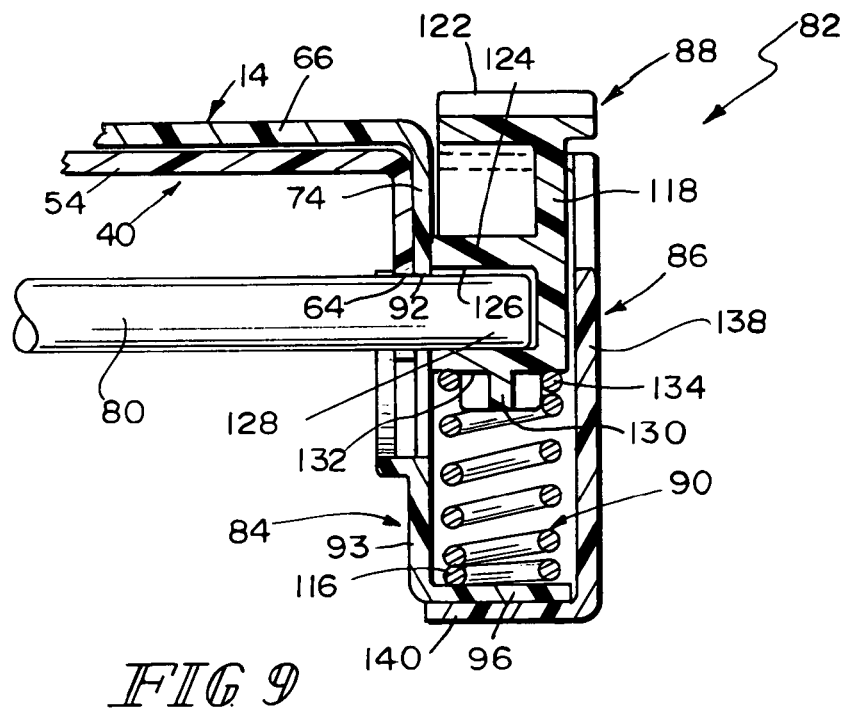
FIG. 9 is a top sectional view taken along line 9—9 of FIG. 7 showing the actuator in the locked position (as shown in FIG. 7, for example) such that the height-adjustment bar is received within one of the slots of the lower back section of the seat back.
Figure 10:
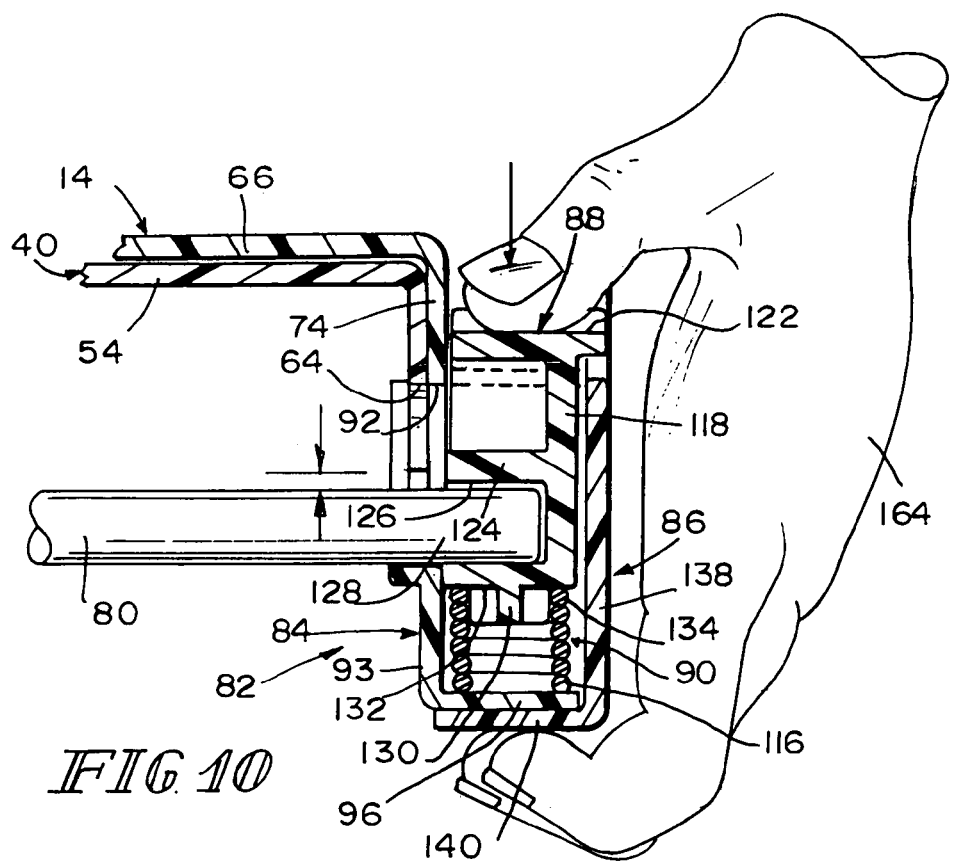
FIG. 10 is a sectional view similar to FIG. 9 showing a user having moved the push-button against the bias of the spring to an unlocked position where the height-adjustment bar coupled to the push-button is disengaged from the slots of the lower back section of the seat back.

A pair of inner side walls 110 of anchor mount 84 are each parallel to and spaced-apart from respective adjacent outer side walls 94. The inner side walls 110 are coupled to end wall 96. A spring-receiving channel 112 is formed between the inner side walls 110 to receive spring 90 therein. A first end 116 of spring 90 rests against an inside surface of end wall 96, as shown in FIGS. 9 and 10, for example. Although anchor mount 84 is described as being coupled to headrest 14, it is within this disclosure for anchor mount 84 and headrest 14 to be formed as a single, unitary component of booster seat 10. Anchor mount 82 includes a flange or lip member 154 coupled to outer wall 93 as shown in FIG. 5. Lip member 154 defines a slot or area between side wall portion 74 and lip member 154 for receiving a portion of respective side rails 60, 62 of lower back section 40 therein. Lip member 154 thus provides an alignment means for aligning headrest 14 and lower back section 40 when seat back 18 is assembled and for maintaining alignment between headrest 14 and lower back section 40 during movement of headrest 14 relative to lower back section 40.

Push-button 88 is generally square-shaped and includes a side or outer wall 118, opposite end walls 120 and a curved front wall 122. In operation, as is discussed below, a user engages curved front wall 122 to move push-button 88 against the bias of spring 90 from the normally locked position to an unlocked position to release height-adjustment bar 80 from within the slots 64 of lower back section 40. As shown in FIG. 5, push-button 88 further includes an inner member 124 coupled to outer wall 118 and formed to define an aperture or cavity 126 for receiving a portion of the height-adjustment bar 80 therein. Illustratively, an end portion 128 of the height-adjustment bar 80 is received therein for back and forth movement of the height-adjustment bar 80 with the push-button 88 of each actuator 82, 83. A spring mount 130 of push-button 88 is coupled to an outer surface of an end wall 132 of inner wall system 124 for mounting a second end 134 of spring 90 thereon.

Figure 7:
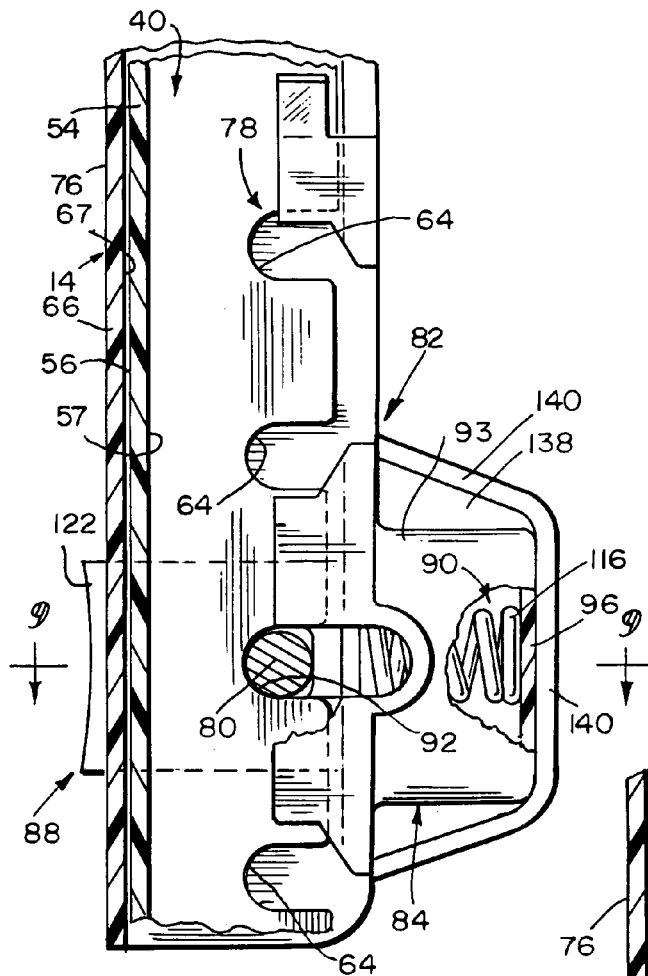
FIG. 7 is a side sectional view taken along line 7—7 of FIG. 1 showing the actuator of the height-adjustment mechanism in a "locked" position such that the height-adjustment bar is received within one of the slots of the lower back section of the seat back.

Push-button 88 is received at least in part within anchor mount 84 such that first and second end walls 120 of push-button 88 are each positioned within a button-receiving space 136 between respective outer side walls 94 of anchor mount 84 and inner side walls 110 of anchor mount 84, as shown in FIG. 6. Spring 90 and at least a portion of inner member 124 are received within channel 112 of anchor mount 84. Cavity or aperture 126 of push-button 88 is generally aligned with slot 92 of anchor mount 84 such that end portion 128 of height-adjustment bar 80 is received through slot 92 and into cavity 126 for back and forth movement with push-button 88 within slot 92. Each spring 90 of actuators 82, 83 functions normally to bias height-adjustment bar 80 to a locked position in engagement with outer vertical bar anchor members or slots 64, as shown in FIGS. 7 and 9. Height-adjustment bar 80 is slidably movable within guide slots 92 in a generally horizontal direction relative to anchor mount 84 and outer cover 86 coupled to anchor mount 84.

Outer cover 86 of actuators 82, 83 includes an outer face plate 138 and side walls 140 appended thereto. Two apertures 142 are formed through outer face plate 138 and are each provided for receiving a screw 100 therethrough to couple outer cover 86 to anchor mount 84. As mentioned above, each screw 100 is received within one of the respective screw mounts 98 of actuator mount 86. Although outer cover 86 is coupled to anchor mount 84 through the use of screws 100, it is within the scope of this disclosure to couple the outer cover 86 to anchor mount 84 using other types of fasteners. Outer cover 86 includes a cut-out portion 144 provided to allow the user to see and engage a portion of the push-button 88 including the curved front wall 122 of push-button 88 as well as a portion of the outer wall 118 of push-button 88. As mentioned above, the components of actuator 82 are identical to the components of actuator 83; therefore, like reference numerals have been used throughout the drawings.

As is mentioned above, bar receivers 78 are provided in the side rails 60, 62 of lower back section 40 of seat back 18. However, it is within the scope of this disclosure to include other bar receivers provided in lower back section 40 of seat back 18. Further, it is within the scope of this disclosure to include only one set of vertical slots 64 provided in lower back section 40 or more than one set of vertical slots, such as the pair of bar receivers 78 shown herein. Each vertical bar receiver 78 is formed to include a plurality of panel height locators such as vertically spaced-apart bar-receiving slots 64 for receiving height-adjustment bar 80 therein to establish a fixed position of headrest 14 relative to the underlying bottom seat portion 20 of base 16. Height-adjustment bar 80 is received within one of the slots 64 when in the locked position.

As shown in FIG. 4, slot 150 is located to define the "lowest" position of the headrest 14 and slot 152 is located to define the "highest" position of headrest 14. Illustratively, seven slots are provided to provide for seven distinct positions of the headrest 14 above bottom seat portion 20 of base 16. It is within this disclosure, however, to provide any suitable number of panel height locators (or slots) for receiving the height-adjustment bar 80 therein to position the headrest 14 at any number of heights above bottom seat portion 20. Although only the outer slots of outer bar receivers 78 are provided, as shown in FIG. 4, it is within the disclosure to include an inner or centrally located panel of slots for receiving the height-adjustment bar 80 therein.

Illustratively, height-adjustment mechanism 12 includes actuators 82, 83 coupled to headrest 14, height-adjustment bar 80 coupled to actuators 82, 83, and bar receivers 78 including slots 64 for receiving height-adjustment bar 80 therein to secure headrest 14 at a certain height above bottom seat portion 20. Illustratively, the lower back section 40 of seat back 18 nests within the headrest 14, as shown in FIG. 2, such that a portion of each side rail 60, 62 of lower back section 40 is positioned to lie between side walls 72, 74 of headrest 14. Further, a portion of base 16 rests within lower back section 40 of seat back 18. Specifically, as mentioned above, rear portions 30 of base 16 are received within the cavities 50 of respective armrest shells 46, 48 and cooperate with armrest shells 46, 48 to form armrests 52 of booster seat 10.

Figure 8:
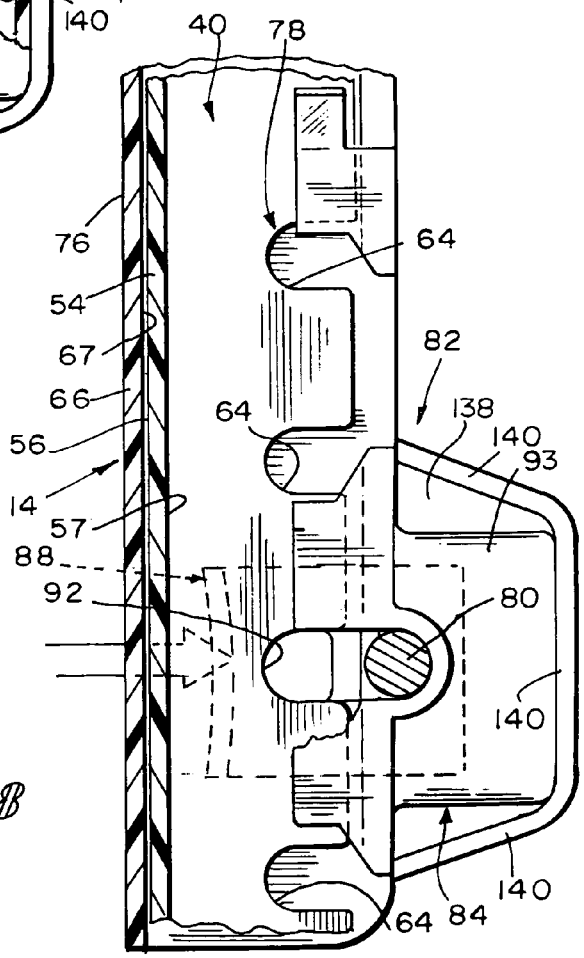
FIG. 8 is a side sectional view similar to FIG. 7 of the actuator in an "unlocked" position showing the push-button having been moved against the bias of the spring to the right in the direction of the arrow to move the height-adjustment bar out of engagement with the slots of the lower portion of the seat back.

In operation, a user 164 may depress push-button 88 against the bias of spring 90 of each actuator 82, 83 to disengage height-adjustment bar 80 from within one of the panel height locator slots 64 of the lower back section 40, as shown in FIGS. 8 and 10. Each push-button 88, therefore, provides means for moving the headrest to the unlocked position by allowing a user to move the each push-button 88, and thus the height-adjustment bar 80, against the bias of spring 90 to release the height-adjustment bar from within one of the slots 64. As mentioned above, actuators 82, 83 are positioned at each end 128 of height-adjustment bar 80 such that each actuator 82, 83 is accessible by the user 164 from the front, back or side of booster seat 10.

Once height-adjustment bar 80 is disengaged from the panel height locator slots 56, the user may adjust the height of the headrest 14 up and down relative to the bottom seat portion 20. Once a desired height has been reached, the user may then release the push-button 88 of each actuator 82, 83. The bias of the each spring 90 will move each respective push-button 88 to the undepressed or unactivated position to also move the height-adjustment bar 80 therewith into engagement with one of the pair of slots 56 of the panel height locator slots.

As shown in FIGS. 7 and 9, height-adjustment mechanism 12 is in the locked position where height-adjustment bar 80 is received within a pair of the slots 64 of the bar receivers 78 and the push-button 88 is biased to the undepressed position by spring 90. As shown in FIG. 10, user 164 grasps actuator 82 and urges push-button 88 (and height-adjustment bar 80 coupled to push-button 88) against the bias of spring 90 to move push-button 88 in a generally horizontal direction away from lower back section 40 of seat back 18 to the release position. Illustratively, height-adjustment bar 80 moves within guide slot 92 of headrest 14 and anchor mount 84.

Once in the release position, as shown in FIGS. 8 and 10, user 164 may move actuators 82, 83 in a generally vertical direction up and down to move headrest 14 (coupled to actuators 82, 83) up and down in order to adjust the height of headrest 14 relative to bottom seat portion 20 of seat 10. Once headrest 14 is moved to the desired position, user 164 releases push-buttons 88 to allow springs 90 to bias each respective push-button 88 (and height-adjustment bar 80 coupled thereto) to the locked position within one of the slots 64 of outer vertical bar receivers 78. As headrest 14 moves up and down relative to lower back section 40, offset distance 190 remains at approximately 0.120 inch (3.05 mm) in order to maintain a smooth and continuous back rest 18 or back rest surface for the juvenile seated therein.

Figure 17:
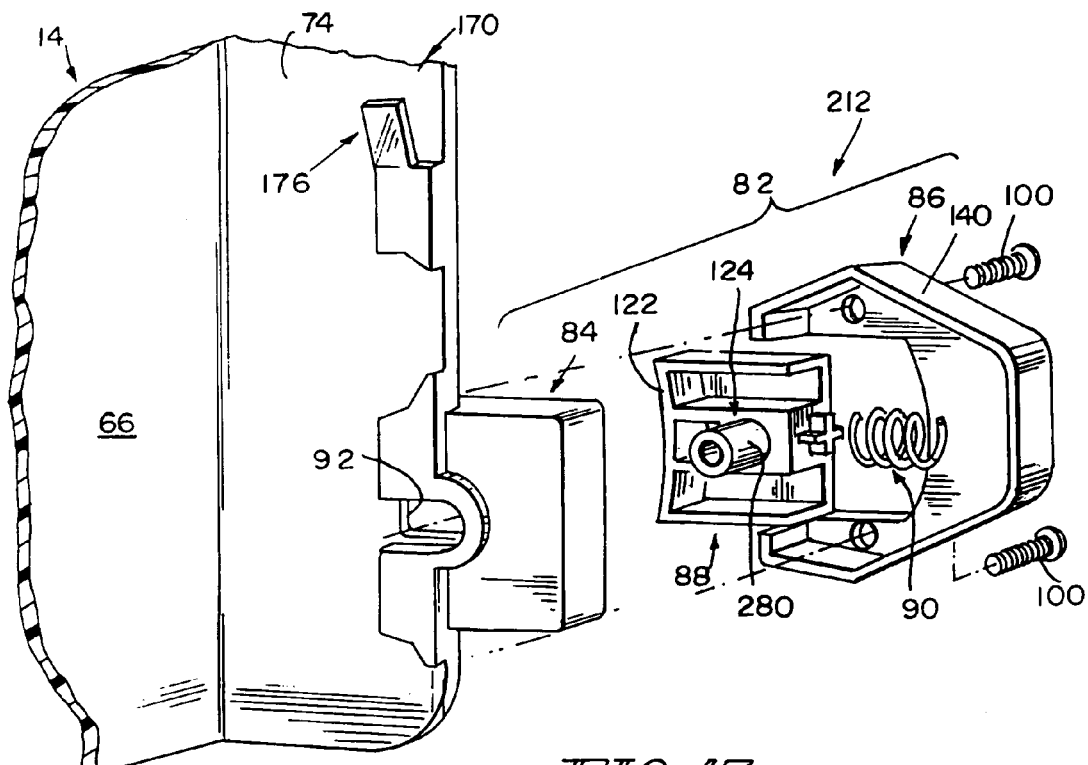
FIG. 17 is a rear perspective, exploded view similar to FIG. 5 showing a portion of an alternative height-adjustment mechanism including a bar or pin coupled to each actuator instead of the height adjustment bar shown in FIG. 5 and showing the bar of the alternative mechanism coupled to the push-button of the actuator to be received within the respective slots of the lower back section.
Figure 18:
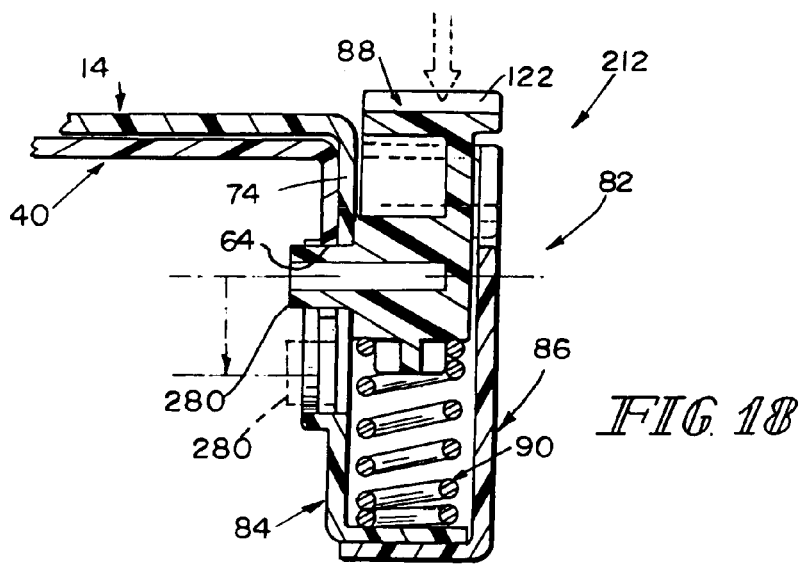
FIG. 18 is a sectional view similar to FIGS. 9 and 10 of the actuator and pin of the alternative height-adjustment mechanism showing the alternative bar of in the locked position received within one of the slots of lower back section.

Looking now to FIGS. 17 and 18, an alternative height adjustment mechanism 212 is provided. Alternative height-adjustment mechanism 212 is similar to height-adjustment mechanism 12 discussed above. Therefore, like reference numerals have been used to denote like components. For example, height-adjustment mechanism 212 includes actuators 82, 83 coupled to headrest 14, an alternative height-adjustment bar or pin 280 coupled to each actuator 82, 83, and bar receivers 78 including slots 64 for receiving respective height-adjustment bars 280 therein to secure headrest 14 at a certain height above bottom seat portion 20. As shown in FIGS. 15 and 16, alternative height-adjustment bar 280 is coupled to push-button 88 of actuator 82 to be received within bar receivers 78 in the locked position. As discussed above and shown in the figures, bar 80 of mechanism 12 is coupled at each end to the push-button 88 of the respective actuators 82, 83 and extends across headrest 14 between each actuator 82, 83. Alternative mechanism 212, on the other hand, includes two bars 280; each bar 280 is coupled to one of the actuators 82, 83. Bars 280 extend only partially across headrest 14 between actuators 82, 83. Illustratively, the height-adjustment bars or 280 of height-adjustment mechanism 212 operate in the same manner as height adjustment bar 80 described above. The term "bar", therefore, is intended to refer to both height-adjustment bar 80 of mechanism 12 and height-adjustment bar 280 of mechanism 212.

The invention claimed is:

1. A juvenile seat comprising
a base including a bottom seat portion,
a lower back section coupled to the base and positioned to lie at an angle relative to the bottom seat portion, the lower back section including a body including a body planar front surface and an outer rim extending around the body planar front surface, the outer rim including oppositely facing side rails arranged to lie in spaced-apart relation to one another to define a width of the lower back section, and
a headrest coupled to the oppositely facing side rails included in the outer rim of the lower back section to extend across the entire width of the lower back section for up-and-down movement relative to the base and the lower back section, the headrest including a headrest planar front surface, wherein the headrest is positioned forward of the body planar front surface of the lower back section, and further wherein an offset distance between the body planar front surface of the lower back section and the headrest planar front surface is less than approximately 0.375 inch (9.53 mm) in order to provide a smooth and continuous back rest surface for the juvenile seated therein.

2. The juvenile seat of claim 1, wherein the offset distance is approximately 0.120 inch (3.05 mm).

3. The juvenile seat of claim 1, further comprising alignment means for maintaining alignment between the headrest and the lower back section as the headrest is moved upwardly and downwardly relative to the lower back section.

4. The juvenile seat of claim 1, wherein the headrest further includes a planar rear surface engaged with the body planar front surface of the lower back section.

5. The juvenile seat of claim 4, wherein the headrest planar front surface and the body planar front surface cooperate to define a seat back of the juvenile seat adapted to support a juvenile's back thereon.

6. The juvenile seat of claim 4, wherein the headrest further includes a back plate formed to define the headrest planar front surface, a top wall coupled to the back plate, and first and second side walls each coupled to the back plate and the top wall, and wherein a rear planar surface of the back plate, the top wall, and the first and second side walls of the headrest cooperate to define an area formed to receive a portion of the lower back section therein.

7. The juvenile seat of claim 6, wherein the lower back section includes a planar wall formed to define the body planar front surface, and a top wall included in the outer rim and coupled to the planar wall, wherein each of the first and second side rails are coupled to the top wall and the planar wall, and wherein the first and second side rails of the outer rim of the lower back section are positioned between the first and second side walls of the headrest.

8. The juvenile seat of claim 6, further comprising a height-adjustment mechanism formed to adjust a height of the headrest above the bottom seat portion of the base relative to the lower back section and including an actuator movable between a locked position to prevent the headrest from moving relative to the lower back section and an unlocked position to permit the headrest to move relative to the lower back section, and wherein the actuator is coupled to one of the first and second side walls of the headrest.

9. The juvenile seat of claim 1, wherein the headrest includes a first side wall and a second side wall spaced-apart from the first side wall and the lower back section includes a first side rail and a second side rail, and wherein the first side wall of the headrest and the first side rail of the lower back section are slidably engaged with each other and the second side wall of the headrest and the second side rail of the lower back section are slidably engaged with each other.

10. The juvenile seat of claim 9, further comprising a height-adjustment mechanism for adjusting a height of the headrest above the bottom seat portion including a first actuator coupled to the first side wall of the headrest and a second actuator coupled to the second side wall of the headrest to provide for side operation of the height-adjustment mechanism.

11. The juvenile seat of claim 10, wherein the height-adjustment mechanism further includes a plurality of vertically-spaced slots provided in the first and second side rails of the lower back section and a height-adjustment bar coupled to each of the first and second actuators and biased to be received within one or more of the vertically-spaced slots, and wherein the first and second actuators are each coupled to one of the height-adjustment bars to move the respective height-adjustment bar from a locked position received within the vertically-spaced slots to an unlocked position disengaged from the vertically-spaced slots.

12. The juvenile seat of claim 1, further comprising an anti-backout mechanism coupled to the headrest to limit a height of the headrest above the bottom seat portion of the base.

13. The juvenile seat of claim 12, further including a height-adjustment mechanism arranged to adjust a height of the headrest above the bottom seat portion of the base and wherein the anti-backout mechanism is positioned above the height-adjustment mechanism.

14. The juvenile seat of claim 12, wherein the anti-backout mechanism includes a stopper coupled to a side wall of the headrest to engage a top wall of the lower back section.

15. The juvenile seat of claim 14, wherein the stopper of the anti-blackout mechanism is a first stopper coupled to a first side wall of the headrest and the anti-backout mechanism includes a second stopper coupled to a second side wall of the headrest to engage the top wall of the lower back section.

16. A juvenile seat comprising
a base including a bottom seat portion,
a lower back section coupled to the base and positioned to lie at an angle relative to the bottom seat portion, the lower back section including a body planar front surface,
a headrest coupled to the lower back section for up and down movement relative to the base and the lower back section, the headrest including a headrest planar front surface, wherein the headrest is positioned forward of the body planar front surface of the lower back section, and further wherein an offset distance between the planar front surface of the lower back section and the headrest planar front surface is less than approximately 0.375 inch (9.53 mm) in order to provide a smooth and continuous back rest surface for the juvenile seated therein, and
alignment means for maintaining alignment between the headrest and the lower back section as the headrest is moved upwardly and downwardly relative to the lower back section, wherein the headrest further includes a back plate formed to define the headrest planar front surface and first and second side walls each coupled to the back plate and the lower back section includes a planar wall formed to define the body planar front surface and first and second side rails each coupled the planar wall, and wherein the alignment means includes a flange coupled to one of the first and second side walls of the headrest to provide a slot between the one of the first and second side walls and the flange such that one of the respective first and second side rails of the lower back section is received within the slot.

17. The juvenile seat of claim 16, wherein the flange is a first flange coupled to the first side wall of the headrest and the alignment means includes a second flange coupled to the second side wall of the headrest to provide a second slot between the second side wall and the second flange to receive a portion of the second side rail of the lower back section therein.

18. The juvenile seat of claim 16, wherein the flange is a first flange coupled to the first side wall of the headrest and the alignment means includes a second flange coupled to the first side wall of the headrest and position in spaced-apart relation to the first flange to provide a second slot between the first side wall and the second flange to receive a portion of the first side rail of the lower back section therein.

19. A juvenile seat comprising
a base including a bottom seat portion,
a lower back section coupled to the base and positioned to lie at an angle relative to the bottom seat portion, the lower back section including a body planar front surface,
a headrest coupled to the lower back section for up and down movement relative to the base and the lower back section, the headrest including a headrest planar front surface, wherein the headrest is positioned forward of the body planar front surface of the lower back section, and further wherein an offset distance between the body planar front surface of the lower back section and the headrest planar front surface is less than approximately 0.375 inch (9.53 mm) in order to provide a smooth and continuous back rest surface for the juvenile seated therein, and alignment means for maintaining alignment between the headrest and the lower back section as the headrest is moved upwardly and downwardly relative to the lower back section, wherein the alignment means includes a first flange coupled to the first side wall of the headrest to define a first slot between the first flange and the first side wall, a second flange coupled to the first side wall of the headrest to define a second slot between the second flange and the first side wall, a third flange coupled to the second side wall of the headrest to define a third slot between the third flange and the second side wall, and a fourth flange coupled to the second side wall of the headrest to define a fourth slot between the fourth flange and the second side wall, and wherein the first side rail of the lower back section is received within the first and second slots and the second side rail of the lower back section is received within third and fourth slots.

20. A juvenile seat comprising
a base including a bottom seat portion,
a lower back section coupled to the base and positioned to lie at an angle relative to the bottom seat portion, the lower back section including a body planar front surface,
a headrest coupled to the lower back section for up and down movement relative to the base and the lower back section, the headrest including a headrest planar front surface, wherein the headrest is positioned forward of the body planar front surface of the lower back section, and further wherein an offset distance between the body planar front surface of the lower back section and the headrest planar front surface is less than approximately 0.375 inch (9.53 mm) in order to provide a smooth and continuous back rest surface for the juvenile seated therein, and
an anti-backout mechanism coupled to the headrest to limit a height of the headrest above the bottom seat portion of the base, wherein the anti-backout mechanism includes a stopper coupled to a side wall of the headrest to engage a top wall of the lower back section and wherein the stopper is a tab positioned at an angle relative to a vertical axis along the side wall, and wherein the tab is movable between an opened, angled position engageable with the top wall of the lower back section and a closed, vertical position adjacent with the side wall of the headrest to pass through a notch formed in the lower back section.

21. The juvenile seat of claim 20, wherein the anti-backout mechanism further includes a flange coupled to the side wall of the headrest, and wherein the flange is formed to define a channel for receiving a portion of a side rail of the lower back section therein, and wherein the stopper is coupled to the flange.

22. A juvenile seat comprising
a base including a bottom seat portion,
a lower back section coupled to the base and positioned to lie at an angle relative to the bottom seat portion, the lower back section including a body planar front surface, and
a headrest coupled to the lower back section for up and down movement relative to the base and the lower back section, the headrest including a headrest planar front surface, wherein the headrest is positioned forward of the body planar front surface of the lower back section, and further wherein an offset distance between the body planar front surface of the lower back section and the headrest planar front surface is less than approximately 0.375 inch (9.53 mm) in order to provide a smooth and continuous back rest surface for the juvenile seated therein, wherein the base includes first and second armrest mounts, the lower back section includes first and second armrest shells each formed to define a cavity therein, and wherein the cavity of each of the first and second armrest shells receives one of the first and second armrest mounts of the base therein in order to couple the lower back section to the base.

23. The juvenile seat of claim 22, wherein each armrest mount of the base and each corresponding armrest shell of the lower back section cooperate to define an armrest of the juvenile seat.

24. The juvenile seat of claim 22, wherein the base includes at least one aperture located between the armrest mounts and the lower back section includes at least one aperture located between the armrest shells to be aligned with the at least one aperture of the base, and wherein the at least one aperture of the base and the lower back section are formed to receive a fastener therein to couple the lower back section to the base.

25. The juvenile seat of claim 22, wherein the first and second armrest shells each include a top wall, a first side wall coupled to the top wall, a second side wall coupled to the top wall and spaced-apart from the first side wall, and an end wall coupled to the top wall and the first and second side walls, and the top wall, end wall, and first and second side walls cooperate to define the cavity formed to receive the portion of the respective first and second side walls of the base therein.

26. The juvenile seat of claim 22, wherein the base includes first and second side walls each forming one of the armrest mounts and each forming a notch therein adapted to receive a portion of a vehicle seat belt therethrough, and wherein each notch is formed between a front portion of each side wall and the armrest mount of each side wall.

27. The juvenile seat of claim 26, wherein each armrest mount of the base is coupled to a rearward portion of the bottom seat portion of the base.

28. The juvenile seat of claim 22, wherein the lower back section further includes first and second side rails coupled to the planar body and wherein the first armrest shell is coupled to the first side rail of the planar body and the second armrest shell is coupled to the second side rail of the planar body.

29. The juvenile seat of claim 28, further including a height-adjustment mechanism for raising and lowering a height of the headrest above the bottom seat portion including vertically-spaced slots provided in the first and second side rails of the lower back section and a height-adjustment bar movable between a locked position received within at least one of the vertically-spaced slots to prevent movement of the headrest relative to the base and the lower back section and an unlocked position disengaged from the vertically-spaced slots to permit movement of the headrest relative to the base and the lower back section.

30. A juvenile seat comprising
a base including a bottom seat portion,
a lower back section coupled to the base and positioned to lie at an angle relative to the bottom seat portion,
a headrest coupled to the lower back section for up-and-down movement relative to the base and the lower back section to adjust a height of the headrest above the bottom seat portion of the base, and
an anti-backout tab coupled to the headrest and movable about an axis between a first position arranged to engage a portion of the lower back section to block removal of the headrest from the lower back section and a second position arranged to disengage the portion of the lower back section to allow removal of the headrest from the lower back section.

31. The juvenile seat of claim 30, further comprising a height-adjustment mechanism arranged to adjust a height of the headrest above the bottom seat portion and wherein the anti-backout mechanism is positioned above the height-adjustment mechanism.

32. The juvenile seat of claim 30, wherein the anti-backout mechanism includes a stopper coupled to a side wall of the headrest to engage a top wall of the lower back section.

33. The juvenile seat of claim 32, wherein the stopper is a tab positioned at an angle relative to a vertical axis along the side wall.

34. A juvenile seat comprising
a base including a bottom seat portion,
a lower back section coupled to the base and positioned to lie at an angle relative to the bottom seat portion,
a headrest coupled to the lower back section for up-and-down movement relative to the base and the lower back section to adjust a height of the headrest above the bottom seat portion of the base, and
an anti-backout mechanism coupled to the headrest to limit the height of the headrest above the bottom seat portion of the base, wherein the anti-backout mechanism includes a stopper coupled to a side wall of the headrest to engage a top wall of the lower back section, wherein the stopper is a tab positioned at an angle relative to a vertical axis along the side wall, and wherein the tab is arranged to move between an opened, angled position engageable with the top wall of the lower back section and a closed, vertical position adjacent with the side wall of the headrest to pass through a notch formed in the lower back section.

35. A juvenile seat comprising
a base including a bottom seat portion,
a lower back section coupled to the base and positioned to lie at an angle relative to the bottom seat portion,
a headrest coupled to the lower back section for up-and-down movement relative to the base and the lower back section to adjust a height of the headrest above the bottom seat portion of the base, and
an anti-backout mechanism coupled to the headrest to limit the height of the headrest above the bottom seat portion of the base, wherein the anti-backout mechanism includes a stopper coupled to a side wall of the headrest to engage a top wall of the lower back section, wherein the stopper is a tab positioned at an angle relative to a vertical axis along the side wall, and wherein the anti-backout mechanism further includes a flange coupled to the side wall of the headrest, the flange is formed to define a channel for receiving a portion of a side rail of the lower back section therein, and the stopper is coupled to the flange.

36. A juvenile seat comprising
a base including a bottom seat portion and first and second side walls coupled to the bottom seat portion and positioned in spaced-apart relation to each other and
a lower back section coupled to the base and positioned to lie at an angle relative to the bottom seat portion, the lower back section including a planar body and first and second armrest shells coupled to the planar body and positioned in spaced-apart relation to each other, each of the first and second armrest shells being formed to define a cavity formed to receive an armrest mount of a respective first and second side wall of the base therein, wherein the first and second side walls of the base each include a notch adapted to receive a portion of a vehicle seat belt therethrough, each notch is arranged to define a front portion and a rear portion of each side wall, and the rear portion of each side wall is the armrest mount of each side wall such that the rear portion of the first side wall is received within the cavity of the first armrest shell of the lower back section and the rear portion of the second side wall is received within the cavity of the second armrest shell of the lower back section.

37. The juvenile seat of claim 36, wherein the armrest of the first side wall of the base and the first armrest shell cooperate to define a first armrest of the juvenile seat and wherein the armrest mount of the second side wall of the base and the second armrest shell cooperate to define a second armrest of the juvenile seat.

38. A juvenile seat comprising
a base including a bottom seat portion and first and second side walls coupled to the bottom seat portion and positioned in spaced-apart relation to each other and
a lower back section coupled to the base and positioned to lie at an angle relative to the bottom seat portion, the lower back section including a planar body and first and second armrest shells coupled to the planar body and positioned in spaced-apart relation to each other, each of the first and second armrest shells being formed to define a cavity formed to receive an armrest mount of a respective first and second side wall of the base therein, wherein the first and second armrest shells each include a top wall, a first side wall coupled to the top wall, a second side wall coupled to the top wall and spaced-apart from the first side wall, and an end wall coupled to the top wall and the first and second side walls, the top wall, end wall, and first and second side walls cooperating to define the cavity formed to receive the armrest mount of the respective first and second side walls of the base therein.

39. A juvenile seat comprising
a base including a bottom seat portion and first and second side walls coupled to the bottom seat portion and positioned in spaced-apart relation to each other and
a lower back section removably coupled to the base and positioned to lie at an angle relative to the bottom seat portion, the lower back section including a planar body and first and second armrest shells coupled to the planar body and positioned in spaced-apart relation to each other, each of the first and second armrest shells being formed to define a nesting cavity formed to receive an armrest support of a respective first and second side wall of the base in nesting relation therein
wherein the lower back section further includes first and second side rails coupled to the planar body and wherein the first armrest shell is coupled to the first side rail of the lower back section and the second armrest shell is coupled to the second side rail of the lower back section.

40. A juvenile seat comprising
a base including a bottom seat portion and first and second side walls coupled to the bottom seat portion and positioned in spaced-apart relation to each other and
a lower back section coupled to the base and positioned to lie at an angle relative to the bottom seat portion, the lower back section including a planar body and first and second armrest shells coupled to the planar body and positioned in spaced-apart relation to each other, each of the first and second armrest shells being formed to define a cavity formed to receive an armrest mount of a respective first and second side wall of the base therein, wherein the lower back section further includes first and second side rails coupled to the planar body and wherein the first armrest shell is coupled to the first side rail of the lower back section and the second armrest shell is coupled to the second side rail of the lower back section, further comprising a height-adjustment mechanism to adjust a height of the headrest above the bottom seat portion of the base and wherein the height-adjustment mechanism includes a first actuator coupled to the first side rail of the lower back section and a second actuator coupled to the second side rail of the lower back section, and the first and second actuators are movable between a locked position to prevent the headrest from moving up and down relative to the base and the lower back section and an unlocked position to permit the headrest to move up and down relative to the base.

41. A juvenile seat comprising a base including a bottom seat portion and first and second side walls coupled to the bottom seat portion and positioned in spaced-apart relation to each other and a lower back section coupled to the base and positioned to lie at an angle relative to the bottom seat portion, the lower back section including a planar body and first and second armrest shells coupled to the planar body and positioned in spaced-apart relation to each other, each of the first and second armrest shells being formed to define a cavity formed to receive an am-west mount of a respective first and second side wall of the base therein, wherein the base includes an aperture formed in the bottom seat portion and positioned between the first and second side walls of the base and the lower back section includes an aperture formed in the planar body, and wherein the aperture of the planar body is aligned with the aperture of the base and each aperture is adapted to receive a fastener therein to couple the lower back section to the base.

42. A juvenile seat comprising a base including a bottom seat portion, a seat back including an outer rim defining a top edge of the seat back and a forwardly facing surface extending downwardly from the top edge toward the bottom seat portion, a headrest including a rearwardly facing surface lying in opposing relation to the forwardly facing surface of the seat back, the headrest being mounted for up-and-down movement on the seat back toward and away from the bottom seat portion, and a height-adjustment mechanism located outside of a space provided between the forwardly facing surface of the seat back and the rearwardly facing surface of the headrest and arranged to move between a locked position to prevent movement of the headrest relative to the seat back and an unlocked position to permit up-and-down movement of the headrest relative to the seat back.

43. The juvenile seat of claim 42, further comprising an anti-backout mechanism coupled to the headrest to block removal of the headrest from the seat back and arranged to lie outside of the space provided between the forwardly facing surface of the seat back and the rearwardly facing surface of the headrest.

44. The juvenile seat of claim 42, wherein the rearwardly facing surface of the headrest faces in a first direction, the headrest further includes a forwardly facing surface facing in a second direction opposite to the first direction, and an offset distance between the forwardly facing surfaces of the seat back and headrest is less than approximately 0.375 inch (9.53 mm).

45. The juvenile seat of claim 44, wherein the offset distance is approximately 0.120 inch (3.05 mm).

46. The juvenile seat of claim 42, the forwardly facing surface of the seat back has a width and the rearwardly facing surface of the headrest is configured to extend across the entire width of the forwardly facing surface of the seat back.

47. The juvenile seat of claim 46, wherein the rearwardly facing surface of the headrest faces in a first direction, the headrest further includes a forwardly facing surface facing in a second direction opposite to the first direction, and an offset distance between the forwardly facing surfaces of the seat back and headrest is less than approximately 0.375 inch (9.53 mm).

48. A juvenile seat comprising a base including a bottom seat portion and a seat back extending upwardly from the base, the seat back including a lower back section coupled to the base and an upper back section mounted for up-and-down movement on the lower back section toward and away from the bottom seat portion, the lower back section including an upwardly extending first side rail facing in a first direction, an upwardly extending second side rail facing in a second direction that is opposite to the first direction, and an upwardly extending front wall extending from the first side rail to the second side rail to define a width of the lower back section, the upper back section including an upwardly extending front wall extending across the entire width of the lower back section, the front wall of the upper back section having a rearwardly facing surface lying in opposing relation to a forwardly facing surface of the front wall of the lower back section and a forwardly facing surface facing away from the lower back section and lying in a position to cause an offset distance between the forwardly facing surfaces of the upper and lower back sections to be less than approximately 0.375 inch (0.53 mm).

49. The juvenile seat of claim 48, wherein the base further includes first and second armrest shell supports arranged to lie in spaced-apart relation to one another to locate the bottom seat portion therebetween, the lower back section further includes a first armrest shell arranged to extend forwardly away from the front wall of the lower back section and formed to define a second nesting cavity receiving a portion of the second armrest shell support therein, the first armrest shell mates with the underlying first armrest shell support to define a first armrest, and the second armrest shell mates with the underlying second armrest shell support to define a second armrest.

50. The juvenile seat of claim 49, wherein the first armrest shell is coupled to the first side rail and the second armrest shell is coupled to the second side rail.

51. The juvenile seat of claim 48, further comprising anti-backout means for selectively blocking removal of the upper back section from the lower back section.

52. The juvenile seat of claim 51, wherein the anti-blackout means includes a first tab support coupled to the first side wall of the upper back section and formed to include a channel receiving a portion of the first side rail therein during up-and-down movement of the upper back section relative to the lower back section to mate and align the lower back section to the upper back section during relative movement of the upper and lower back sections to provide for the offset distance and the anti-backout means further includes a first tab coupled to the first tab support for movement between a removal-allowing position located a first distance from the first side wall of the upper back section and arranged to pass through a notch formed in a retention flange included in the lower back section to allow removal of the upper back section from the lower back section and a removal-blocking position located a greater second distance from the first side wall of the upper back section and arranged to engage the retention flange to block removal of the upper back section from the lower back section.

53. The juvenile seat of claim 48, wherein the upper back section further includes upwardly extending first and second side walls coupled to the upwardly extending front wall of the upper back section and arranged to lie in spaced-apart relation to one another to locate the upwardly extending front wall of the upper back section therebetween and to locate the upwardly extending first and second side walls of the lower back section therebetween.

54. The juvenile seat of claim 53, wherein the upper back section further includes a rearwardly extending top wall that cooperates with rearwardly extending portions of the first and second side walls to define a rearwardly facing cavity defining a lower back section receiving area receiving an upper mating portion of the lower back section therein such that the first and second side rails of the lower back section are positioned between and lie adjacent to the respective first and second side walls of the upper back section.

55. The juvenile seat of claim 53, further comprising a height-adjustment mechanism comprising a series of notches formed in the first and second side rails of the lower back section, a height-adjustment bar arranged to extend laterally across the width of the lower back section and to fit into the notches formed in the first and second side rails, and actuator means for moving the height-adjustment bar toward the front wall of the lower back section to mate with one notch formed in each of the first and second side rails to establish a selected elevated height of the upper back section relative to the bottom seat portion of the base.

56. The juvenile seat of claim 55, wherein the actuator means includes a first actuator coupled to the first side wall of the upper back section and to the height-adjustment bar and a second actuator coupled to the second side wall of the upper back section and to the height-adjustment bar.

* * * * *